United States Patent [19]

O'Brien

[11] 4,020,681
[45] May 3, 1977

[54] PORTABLE STRAIN GAUGE
[76] Inventor: John W. O'Brien, 607 S. Kelly St., Harrison, Ark. 72601
[22] Filed: Aug. 25, 1975
[21] Appl. No.: 607,480
[52] U.S. Cl. .............................. 73/88 R; 33/DIG. 1; 33/147 D
[51] Int. Cl.² .......................................... G01B 5/30
[58] Field of Search ..... 73/88 R; 33/147 D, 148 D, 33/DIG. 1, DIG. 13; 335/295

[56] References Cited
UNITED STATES PATENTS

| 2,099,662 | 11/1937 | Slonneger | 33/147 D |
| 2,316,975 | 4/1943 | Ruge | 73/88.5 R X |
| 2,622,440 | 12/1952 | Friedman | 33/148 D X |
| 2,900,613 | 8/1959 | Dahl | 73/88.5 R X |
| 3,082,621 | 3/1963 | Soderholm | 73/88 R |
| 3,089,066 | 5/1963 | Vc et al. | 33/DIG. 1 |

Primary Examiner—Charles A. Ruehl
Attorney, Agent, or Firm—Lowe, Kokjer, Kircher, Wharton & Bowman

[57] ABSTRACT

A portable strain gauge for measuring stress in a bar. The instrument includes a pair of spaced magnetic bases that magnetically adhere to the bar. A pair of mounting pads may be firmly strapped to the bar at suitable spacing in order to mount the bases in situations where the bar is nonmagnetic. An actuator rod has one end fixed to the first base and its other end freely slides in an axial direction relative to the second base. A pivotal lever is spring biased against the actuator rod to pivot in proportion to movement of the rod relative to the second base as the bar is stressed. A dial indicator includes a plunger that is spring biased against the lever at a location offset from the actuator rod. The lever displaces the plunger in proportion to the movement of the actuator rod in order to mechanically convert the strain on the bar into stress which is indicated on the dial indicator.

9 Claims, 9 Drawing Figures

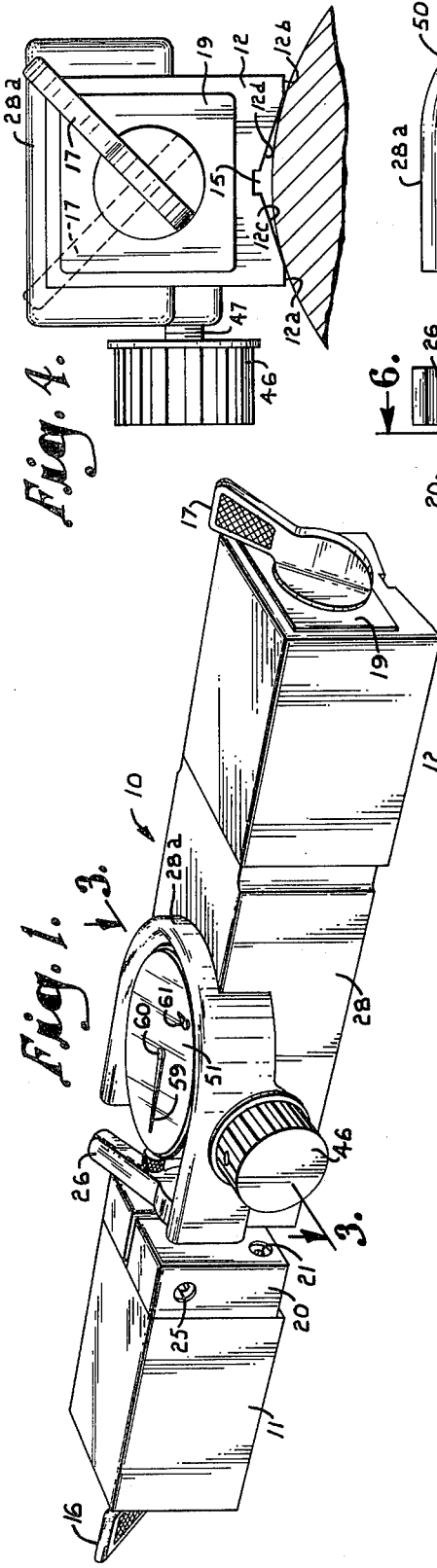

PORTABLE STRAIN GAUGE

BACKGROUND AND SUMMARY OF THE INVENTION

This invention relates generally to a strain gauge and is concerned more particularly with a portable strain gauge for measuring the stress in bars.

Conventional strain gauges whether electrical or mechanical, are characterized by a number of disadvantages as to cost, maintenance, complexity, and accuracy after prolonged use. In addition, the proper attachment of existing strain gauges to the specimens that are to be measured involves considerable time and difficulty, and this makes them unsatisfactory in situations where quick attachment and detachment is necessary or desirable.

One such situation is frequently encountered in the pressure molding industry, particularly die casting and plastic molding. The dies or molds are held tightly closed by metal platens which are moved together by a toggle linkage system that includes four tie bars. These tie bars receive the entire force that locks the dies or molds together, and it is extremely important to assure that the locking force is distributed equally among the tie bars in order to avoid excessive wear and damage to the expensive locking mechanism. Therefore, it is necessary to use a strain gauge to measure the stress on each tie bar so that appropriate adjustments can be made to equalize the stress on the tie bars. As previously indicated, the instruments presently available for this purpose are not only expensive to manufacture and maintain, but also require excessive time to attach to and detach from each of the tie bars.

Accordingly, there is a need for a strain gauge that is economical, easily operated, and quickly attached to and detached from the bars that are to be measured. It is the primary goal of the present invention to fulfill this need.

More specifically, it is an object of the invention to provide a strain gauge that may be quickly and easily attached to a bar and detached therefrom. This important object is achieved through the use of magnetic mounting bases that are able to adhere directly to steel bars. The invention further contemplates the use of mounting pads which may be strapped to the bar and which adhere to the magnetic bases in situations where the bar itself is not able to be magnetically attracted to the bases.

Another object of the invention is to provide a strain gauge that operates to mechanically convert the deformation or strain of a bar directly into an accurate readout of the stress on the bar.

A further object of the invention is to provide a strain gauge of the character described in which a standard commercially available dial indicator is incorporated without requiring further modification.

Still another object of the invention is to provide a strain gauge of the character described in which the operating mechanism is protected against excessive forces and wear during use.

An additional object of the invention is to provide a strain gauge of the character described that includes a lock for holding the operating mechanism in place between uses in order to protect it against damage.

Yet another object of the invention is to provide a strain gauge of the character described in which the operating components are easily accessible for adjustment, inspection and repair.

A still further object of the invention is to provide a strain gauge of the character described that is economical to manufacture, simple to use, and accurate and reliable in operation even after extensive use.

Other and further objects of the invention, together with the features of novelty appurtenant thereto, will appear in the course of the following description of the drawings.

DETAILED DESCRIPTION OF THE INVENTION

In the accompanying drawings which form a part of the specification and are to be read in conjunction therewith, and in which like reference numerals are employed to indicate like parts in the various views:

FIG. 1 is a perspective view of a strain gauge constructed in accordance with a preferred embodiment of the invention;

FIG. 2 is an enlarged side elevational view showing the strain gauge of FIG. 1 mounted on a bar, the bar being illustrated only fragmentarily and the strain gauge being partially in section to illustrate the internal structure;

FIG. 3 is an enlarged, fragmentary sectional view taken generally along line 3—3 of FIG. 1 in the direction of the arrows;

FIG. 4 is an end elevational view taken from the right end of FIG. 2, the broken lines indicating one of the magnet operating levers rotated 90° from its solid line position;

FIG. 5 is a fragmentary top plan view on an enlarged scale of the strain gauge shown in FIG. 1, with portions in section to illustrate certain internal details;

Figure 8:
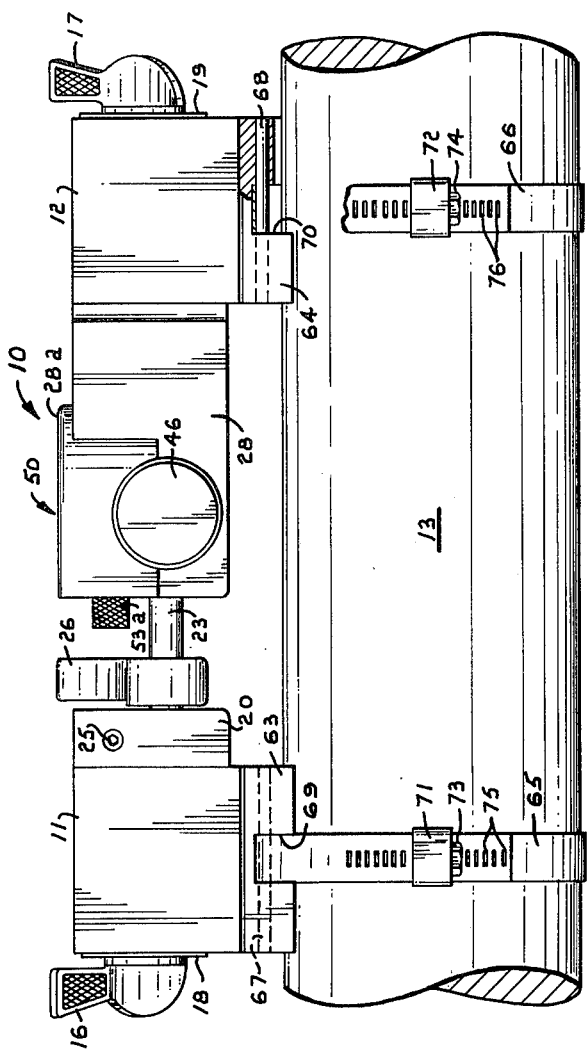
Figure 9:
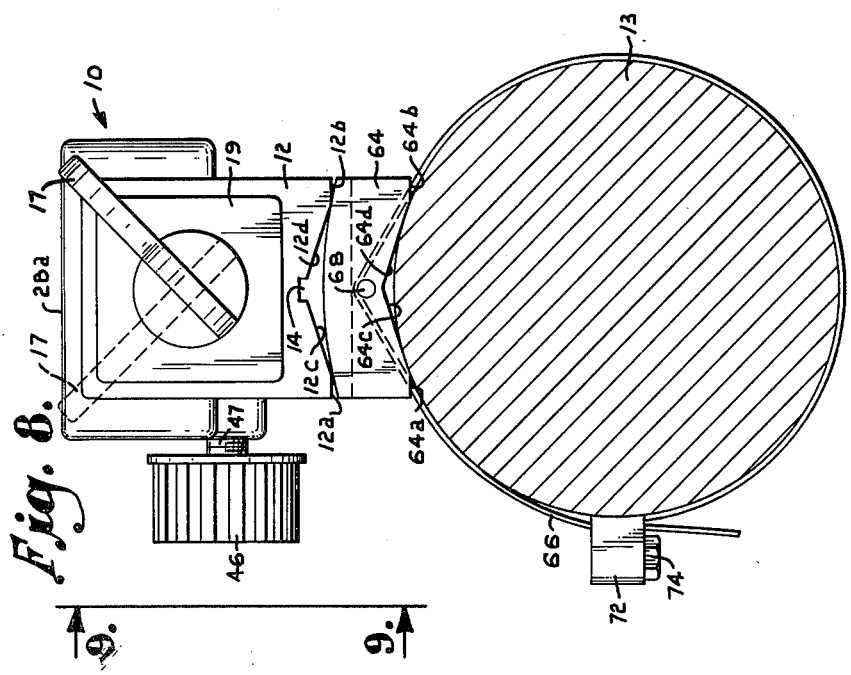

FIG. 8 is an end elevational view showing the strain gauge mounted on top of mounting pads that are strapped to the bar in accordance with the teachings of the invention, the broken lines indicating one of the magnet operating levers rotated 90° from its solid line position; and FIG. 9 is a side elevational view on a reduced scale taken generally along line 9—9 of FIG. 8 in the direction of the arrows, with a portion of one mounting pad and strap broken away for illustrative purposes.

Figure 6:
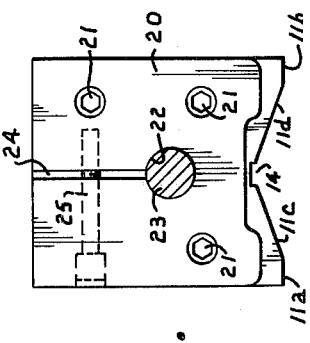
FIG. 6 is an elevational view taken generally along line 6—6 of FIG. 5 in the direction of the arrows.

Referring now to the drawings in detail and initially to FIGS. 1-7, the strain gauge is generally designated by reference numeral 10. A pair of magnetic bases 11 and 12 which are commercially available units of well known construction and operation are incorporated in the instrument. Bases 11 and 12 are generally rectangular blocks having undersides that are shaped to readily seat on cylindrical bars of various diameters, as well as on flat bars. With reference to FIG. 6, the underside of base 11 includes flat horizontal surfaces 11a and 11b near its side edges that are able to seat on bars having flat surfaces. The underside of base 11 further includes inclined surfaces 11c and 11d that angle slightly upwardly from surfaces 11a and 11b toward the center of the base in order to permit the base to seat on cylindrical bars such as the bar indicated by numeral 13 in the drawings. A notch 14 is formed centrally in the underside of base 11 between surfaces 11c and 11d.

Referring to FIG. 4, the underside of base 12 is shaped identically, having flat horizontal surfaces 12a and 12b near its side edges, upwardly inclined surfaces 12c and 12d, and a central notch 15 located between surfaces 12c and 12d.

Each base 11 and 12 has an internal magnet (not shown) which is supported for rotation within the base. These magnets operate in a well known manner to produce strong magnetic fields across the undersides of bases 11 and 12 when set in one rotative position, while rotation of the magnets 90° neutralizes the magnetic field. The magnetic field produced across the bottom surfaces of bases 11 and 12 by the magnets is uniform throughout the entire area of the base undersides. Respective hand levers 16 and 17 are coupled to the magnets in a conventional manner to effect rotation of the magnets upon rotation of the levers. Levers 16 and 17 have circular bases which rotate against respective plates 18 and 19 that are secured to the outer ends of bases 11 and 12.

A generally square block 20 is mounted to one end of base 11 by three screws 21 (FIG. 6). Block 20 is provided with an internally threaded bore 22 which receives a threaded end of a cylindrical actuator rod 23. Rod 23 may be threaded into or out of bore 22 to adjust its position with respect to base 11. The upper portion of block 20 is split at 24 from bore 22 upwardly to the top of the block. Screws 21 are located to permit slight relative movement of the upper portions of the split block toward and away from one another. A screw 25 which is recessed within one of the split portions of block 20 extends across the split area 24 and is threaded into the other split portion of the block. Screw 25 may be tightened to move the upper block portions toward one another in order to assure that the threaded end of actuator rod 23 is firmly held in place in bore 22.

With particular reference to FIG. 2, a lever 26 is secured to rod 23 at an accessible location near block 20. Rod 23 is extended through a central bore in the circular base of lever 26, and a set screw 27 is tightened against rod 23 to rigidly secure lever 26 thereto. Actuator rod 23 may be threaded into or out of bore 22 to the desired position by appropriate rotation of lever 26.

With continued reference to FIG. 2, a rectangular housing 28 is secured to the left end of base 12. A cylindrical bore 29 is formed in housing 28 from the left end thereof in order to slidably and freely receive actuator rod 23. A smaller diameter bore 30 extends concentrically from the inward end of bore 29. An annular shoulder 31 (FIG. 7) is formed between bores 29 and 30, and the end of rod 23 engaging shoulder 31 limits the inward movement of rod 23 into bore 29.

Figure 7:
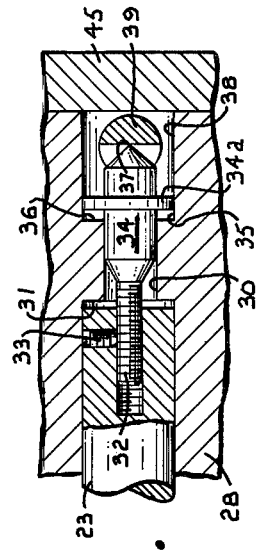
FIG. 7 is a fragmentary sectional view on an enlarged scale taken generally along line 7—7 of FIG. 2 in the direction of the arrows.

As best illustrated in FIG. 7, a flat headed screw 32 is threaded into the end of rod 23 and projects into bore 30. Screw 32 may be threadingly adjusted as to the distance it projects from the end of rod 23. A set screw 33 which is recessed in rod 23 is tightened against the shank of screw 32 to lock the same in place. The flat head of screw 32 fits against the end of a short rod member 34 which is coaxial with rod 23 and which fits closely but slidably in bore 30. An intermediate portion of rod 34 is provided with an enlarged circular collar 34a that fits within a counter bore 35 which is formed at the inward end of bore 30. An annular shoulder 36 located between bore 30 and the larger counter bore 35 provides a stop for collar 34a to limit the movement of rod 34 to the left as viewed in FIGS. 2 and 7.

The end of rod 34 remote from screw 32 tapers in conical fashion to a tip 37 which extends into a rectangular recess 38 formed within housing 28. A vertical lever 39 is mounted within recess 38. A horizontal pin 40 pivotally connects the lower end of lever 39 to housing 28 at a location below rod 34, the lever being permitted to pivot about the axis of pin 40. Lever 39 may be fabricated from square or round stock. A cylindrical configuration is illustrated in the drawings. As shown in FIG. 2, a recess 41 is formed in one side of lever 39 at an intermediate location thereon. The conical rod tip 37 bears against lever 39 within recess 41. The upper end of lever 39 is recessed at 42 on the opposite side of the lever from recess 41 and one end of a compression spring 43 bears against lever 39 within recess 42. The opposite end of spring 43 seats within a recess 44 formed in the face of a rectangular block 45 which is secured against base 12 within housing 28. Block 45 is spaced a short distance from lever 39. Spring 43 urges lever 39 to pivot counter-clockwise as viewed in FIG. 2 and thus maintains the lever against the conical tip of rod 34 at all times.

Referring now to FIG. 3 in particular, a knob 46 is mounted on the end of a threaded shaft 47 which is threaded into a bore 48 formed in the side of housing 28. Actuator rod 23 is provided with a reduced diameter portion 49 at an intermediate location on the rod, and shaft 47 may be tightened against portion 49 to lock rod 23 in place in housing 28. Knob 46 is easily accessible to effect this locking which holds the two bases 11 and 12 in place and maintains rod 23 stationary when the strain gauge is not in use or is being transported. Rod 23 is not able to move sufficiently to damage lever 39 or the associated mechanism even if knob 46 is slightly loose, since the end of shaft 47 will engage the areas of rod 23 on either side of the reduced diameter portion 49 before this occurs.

A dial indicator which is a commercially available unit that operates in a well-known manner is generally indicated by numeral 50. This indicator 50 includes a calibrated dial face 51 and a housing 52 (FIG. 2) through which a hollow cylindrical tube 53 extends. Mechanism 50 is mounted in a recessed area at the top of housing 28 and is substantially surrounded by an upstanding V-shaped ridge 28a of the housing in order to recess the dial face 51 below the top of ridge 28a. Tube 53 extends parallel to actuator rod 23 within a bore 54 formed in housing 28 directly above bore 29. A set screw 55 (FIG. 5) is threaded into housing 28 and locked against tube 53 to mount the dial indicator to housing 28. The left end of tube 53 is provided with a knurled knob 53a which projects beyond the left end of housing 28.

A plunger 56 (FIG. 2) having an enlarged head slidably fits within tube 53 and is biased outwardly or to the right as viewed in FIG. 2 by a compression spring 57 that acts against the enlarged head of the plunger. Spring 57 is considerably weaker than spring 43. The head of plunger 56 tapers in a conical manner to present a tip 58 which bears against lever 39 at a point thereon directly across from spring 43. Tip 58 is maintained against lever 39 at all times due to the action of springs 43 and 57. It is noted that the point where plunger 56 contacts lever 39 is a considerably greater distance from pivot pin 40 than the point where tip 37 contacts the lever 39 so that the lever acts as a multiplying arm to amplify movement of plunger 56 in response to movement of rod 34.

The dial indicator 50 operates conventionally in a manner whereby the forced retraction of plunger 56 into tube 53 is translated into clockwise rotational movement of a pointer 59 (FIG. 5) on the dial face 51. To accomplish this, plunger 56 is linked to a shaft 60 on which pointer 59 is mounted by conventional linkage (not shown) that is located within the mechanism housing 52. This linkage effects clockwise rotation of shaft 60 in proportion to the inward linear movement of plunger 56 in tube 53.

The dial face 51 is provided with usual calibrated scale from 1 to 10 around its circumference. A small pointer 61 rotates on the dial face to indicate on a scale calibrated from 1 to 5 the number of complete revolutions through which pointer 59 moves. Pointer 61 rotates in the described manner by conventional linkage (not shown) that interrelates its movement to that of pointer 59 so that each revolution of pointer 59 moves pointer 61 upwardly one calibration mark on its scale.

In operation, the strain gauge is used to indicate the stress exerted on a bar such as the bar 13. To mount the strain gauge on bar 13, bases 11 and 12 are placed on the bar with levers 16 and 17 initially positioned such that the internal magnets do not apply a magnetic field across the bottoms of the bases. Lever 17 is then rotated 90° to reposition the magnet within base 12, and this magnet produces magnet forces that firmly seat base 12 on bar 13 in the position shown in FIG. 4. If bases 11 and 12 are slightly misaligned with respect to the axis of bar 13, the action of the energized magnet within base 12 assures that base 11 is adjusted into axial alignment with base 12. Subsequent rotation of lever 16 through 90° repositions the magnet within base 11, and both bases 11 and 12 are thus firmly mounted on bar 13 with actuator rod 23 exactly parallel to the axis of bar 13 and housing 28 spaced slightly above the bar.

Since knob 46 will be tightened to lock rod 23 and bases 11 and 12 in place between uses, the knob must be loosened in order to free rod 23. Before bar 13 is placed under stress, lever 26 is rotated to adjust the position of rod 23 in bore 22 until pointer 59 indicates 0 on the scale of the dial face 51. When bar 13 is placed under tensile stress, the longitudinal strain or deformation of the bar between bases 11 and 12 moves the bases apart relative to one another. It is again pointed out that the magnetic fields produced by the magnets within bases 11 and 12 are uniform along the lengths of the bases. Therefore, despite the deformation of bar 13 in the portions thereof beneath bases 11 and 12, the internal forces within the bar in the area between the bar and each magnetic base are equal and opposite on opposite sides of an imaginary vertical plane passing centrally through the base. Accordingly, for each base 11 and 12, the deformation of bar 13 beneath the base is equal on opposite sides of a central vertical plane passing through the base, and the movement of these vertical planes relative to one another gives an accurate measurement of the total axial deformation of bar 13 between the vertical planes. During the application of stress on bar 13, the bases 11 and 12 move apart a distance indicative of the deformation of bar 13 between the centers of bases 11 and 12.

As a result of the relative movement of rod 23 to the left in bore 29, spring 43 pivots lever 39 counter-clockwise as viewed in FIG. 2 to maintain the lever against tip 37. As lever 39 pivots, its upper end pushes plunger 56 inwardly in tube 53 a much greater distance than the distance that rod 23 moves relative to base 12, since plunger 56 is more remote from pivot coupling 40 than rod 34. The rotation imparted to pointer 59 as plunger 56 is depressed is proportional to the pivotal distance that lever 39 is moved, and pointer 59 thus rotates in proportion to the relative movement between bases 11 and 12, or the strain in bar 13.

In the case of steel tie bars for die casting molds, a locking stress of 10,000 PSI is normally desirable on each tie bar. It is contemplated that the strain gauge will be constructed with bases 11 and 12 spaced a fixed distance apart, and rod 34 and plunger 56 engaging lever 39 at selected positions wherein a stress of 10,000 PSI on the tie bar will result in exactly one complete revolution of pointer 59 on dial face 51. This permits each tie bar to be adjusted until a single revolution of pointer 59 results when the tie bar is placed under load, and the stress on each tie bar is then 10,000 PSI as desired. In this manner, the stress may be quickly and easily equalized on all four tie bars.

It is pointed out that the close sliding fit of rod 34 in bore 30 provides a seal which prevents contaminants from entering the area of lever 39 and its associated components, while also assuring that lever 39 will be engaged by tip 37 at exactly the same location each time, even if rod 23 is slightly off-center in its bore 29. Rod 23 preferably bottoms out against shoulder 31 immediately after pointer 59 moves below 0 on its scale. This protects lever 39 against excessive pivotal movement in one direction, and the engagement of collar 34a against shoulder 36 prevents the lever from pivoting excessively in the opposite direction.

Although lever 39 amplifies the movement of rod 23 relative to base 12 in the embodiment illustrated in the drawings, it is noted that the lever primarily converts the strain in bar 13 to a calibrated stress reading on the dial indicator. Consequently, it is contemplated that in situations where bases 11 and 12 are separated a greater distance than in the illustrated embodiment, the relative positions of rod 23 and plunger 56 with respect to coupling 40 may be selected to convert movement of rod 23 into a smaller movement of plunger 56; i.e., plunger 56 may be positioned more closely to pivot coupling 40 than the distance of rod 23 from the pivot coupling.

Referring now to FIGS. 8 and 9, the invention further includes the provision of mounting pads 63 and 64 which are intended for use if the bar 13 is coated with a non-magnetic substance such as chrome or paint, or if the bar is otherwise unable to magnetically adhere to bases 11 and 12. Pads 63 and 64 are constructed of ferro magnetic material and are of the same length and width as bases 11 and 12. The underside of each pad 63 and 64 may be contoured as shown or may be a flat surface. Either shape is suitable for affixing to cylindrical bars of various diameters, as well as to flat bars. As shown in FIG. 8, the illustrated underside of pad 64 includes flat horizontal surfaces 64a and 64b near its side edges, and flat inclined surfaces 64c and 64d which angle slightly upwardly from surfaces 64a and 64b toward the center of the pad. The top surface of pad 64 is slightly rounded to accommodate base 12 thereon. Pad 63 is shaped identically to pad 64.

Pads 63 and 64 are attached to bar 13 by respective flexible straps 65 and 66 which are longer than the circumference of bar 13. Pads 63 and 64 have respective pins 67 and 68 mounted longitudinally therein for the purpose of receiving straps 65 and 66. Respective openings 69 and 70 are formed in each side of each pad 63 and 64 at centered locations along the lengths of the pads. Openings 69 and 70 permit straps 65 and 66 to be passed over pins 67 and 68 and drawn tightly around bar 13 to mount the pads.

Straps 65 and 66 are provided with conventional locking mehcanisms which secure the straps. Blocks 71 and 72 are mounted on one end of the respective straps. Each block 71 and 72 has an opening (not shown) into which is introduced one end of strap 65 and 66 respectively having a series of adjustment openings 75 and 76. The adjustment notches or openings 75 and 76 are engaged by worm gear type screws 73 and 74. Rotation of the screws 73 and 74 thus causes the end of the strap to move through the associated block in the conventional manner to tighten the straps securely around the bar 13.

If bar 13 is unable to magnetically adhere to bases 11 and 12, pads 63 and 64 are mounted on the bar in the foregoing manner at appropriately spaced positions. Straps 65 and 66 prevent the pads from slipping during the application of stress on bar 13. Since the pads are ferro magnetic, the magnetic bases 11 and 12 are able to firmly adhere to the top surfaces of the pads, and the bases may be mounted on the pads by energizing the magnets. The strain gauge may thus be quickly and easily applied to bars that are constructed of or coated with nonmagnetic material. After it has been mounted on pads 63 and 64, the strain gauge operates in the manner previously described to indicate the stress on bar 13.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not a limiting sense.

Having thus described the invention, I claim:

1. A strain gauge for a stressed, magnetic bar member, said gauge comprising:
   first and second bases;
   quick release attachment means including magnets associated with the respective first and second bases for mounting said bases on the bar member by magnetic attraction thereto, said attachment means further including uniformly flat engagement surfaces for contacting said bar member;
   an actuator member having opposite ends, one of said ends being secured to said first base and the other of said ends being freely received by said second base for sliding axial movement relative to the second base upon deformation of the bar member; and
   indicator means cooperating with said actuator member to provide an output indication proportional to the amount of axial movement of said actuator member relative to said second base.

2. The gauge as set forth in claim 1, including means for operatively energizing and deenergizing said magnets, said magnets upon energization producing magnetic forces in said first and second bases.

3. The gauge as set forth in claim 2, wherein each of said first and second bases has an undersurface extending axially of the bar member, said magnets upon energization producing magnetic fields of substantially uniform strength along said base undersurfaces.

4. A strain gauge for a stressed, magnetic bar member, said gauge comprising:
   first and second bases;
   quick release attachment means including magnets associated with the respective first and second bases for mounting said bases on the bar member by magnetic attraction thereto, said attachment means further including uniformly flat engagement surfaces for contacting said bar member;
   an actuator rod secured at one end to said first base and freely received by said second base at the other end for sliding axial movement relative to the second base upon deformation of the bar member;
   a lever coupled to said second base for pivotal movement about a pivot axis, said other end of the actuator rod engaging said lever at a location thereon offset from said pivot axis;
   biasing means urging said lever in a pivotal direction to maintain same against said actuator rod, thereby pivotally displacing said lever in proportion to the amount of axial movement of said actuator rod relative to said second base;
   an indicator member supported for movement to provide a visual output indication; and
   mechanical linkage engaging said lever at a location thereon offset from said pivot axis and from said actuator rod, said linkage being coupled with said indicator member in a manner to effect movement thereof in proportion to the pivotal displacement of said lever.

5. The gauge as set forth in claim 4, including releasable means for locking said actuator rod to said second base to prevent relative movement therebetween.

6. The gauge as set forth in claim 4, including means for adjusting the position of said one end of the actuator rod relative to said first base.

7. The gauge as set forth in claim 4, including stop means associated with said actuator rod for limiting the pivotal movement of said lever in both pivotal directions.

8. A strain gauge for a stressed, non-magnetic bar member, said gauge comprising:
   a pair of magnetic mounting pads and means for securing said mounting pads to said bar member;
   first and second bases;
   quick release attachment means including magnets associated with the respective first and second bases for securing said bases to said mounting pads by magnetic attraction thereto, said attachment means further including uniformly flat engagement surfaces for contacting said mounting pads;
   an actuator member having opposite ends, one of said ends being secured to said first base and the other of said ends being freely received by said second base for sliding axial movement relative to the second base upon deformation of the bar member; and
   indicator means cooperating with said actuator member to provide an output indication proportional to the amount of axial movement of said actuator member relative to said second base.

9. A strain gauge for a stressed, non-magnetic bar member, said gauge comprising:
   a pair of magnetic mounting pads and means for securing said mounting pads to said bar member; first and second bases;
   quick release attachment means including magnets associated with the respective first and second bases for securing said bases to said mounting pads by magnetic attraction thereto, said attachment means further including uniformly flat engagement surfaces for contacting said mounting pads;
   an actuator rod secured at one end to said first base and freely received by said second base at the other end for sliding axial movement relative to the second base upon deformation of the bar member;
   a lever coupled to said second base for pivotal movement about a pivot axis, said other end of the actuator rod engaging said lever at a location thereon offset from said pivot axis;
   biasing means urging said lever in a pivotal direction to maintain same against said actuator rod, thereby pivotally displacing said lever in proportion to the amount of axial movement of said actuator rod relative to said second base;
   an indicator member supported for movement to provide a visual output indication; and
   mechanical linkage engaging said lever at a location thereon offset from said pivot axis and from said actuator rod, said linkage being coupled with said indicator member in a manner to effect movement thereof in proportion to the pivotal displacement of said lever.

* * * * *